United States Patent
Yefet et al.

(10) Patent No.: US 12,224,950 B2
(45) Date of Patent: Feb. 11, 2025

(54) EFFICIENT NETWORK DEVICE WORK QUEUE

(71) Applicant: MELLANOX TECHNOLOGIES, LTD., Yokneam (IL)

(72) Inventors: Gal Yefet, Haifa (IL); Daniel Marcovitch, Yokneam Illit (IL); Roee Moyal, Yokneam Illit (IL); Gil Bloch, Zichron Yaakov (IL); Ariel Shahar, Jerusalem (IL); Yossef Itigin, Hod Hasharon (IL)

(73) Assignee: Mellanox Technologies, Ltd, Yokneam (IL)

( * ) Notice: Subject to any disclaimer, the term of this patent is extended or adjusted under 35 U.S.C. 154(b) by 282 days.

(21) Appl. No.: 17/979,018

(22) Filed: Nov. 2, 2022

(65) Prior Publication Data

US 2024/0146664 A1    May 2, 2024

(51) Int. Cl.
 *G06F 15/16*   (2006.01)
 *H04L 47/62*   (2022.01)
 *H04L 47/625*  (2022.01)
 *H04L 47/6275* (2022.01)

(52) U.S. Cl.
 CPC ...... *H04L 47/6255* (2013.01); *H04L 47/6225* (2013.01); *H04L 47/6275* (2013.01)

(58) Field of Classification Search
 CPC ............. H04L 47/6225; H04L 47/6255; H04L 47/6275
 USPC .......................................................... 709/238
 See application file for complete search history.

(56) References Cited

U.S. PATENT DOCUMENTS

| | | | |
|---|---|---|---|
| 5,347,637 A | 9/1994 | Halford | |
| 6,041,058 A | 3/2000 | Flanders et al. | |
| 6,704,831 B1 * | 3/2004 | Avery | G06F 13/404 710/310 |
| 7,286,549 B2 * | 10/2007 | Gaur | H04L 49/90 370/412 |
| 7,346,707 B1 * | 3/2008 | Erimli | G06F 13/28 709/212 |

(Continued)

FOREIGN PATENT DOCUMENTS

CN    1529256 A    9/2004

OTHER PUBLICATIONS

Rozenbaum et al., U.S. Appl. No. 17/714,207, filed Apr. 6, 2022.

(Continued)

*Primary Examiner* — Moustafa M Meky
(74) *Attorney, Agent, or Firm* — Meitar Patents Ltd.; Daniel Kligler

(57) ABSTRACT

In one embodiment, a system includes a memory to store a work queue including work queue entry slots, a processing device to write work queue entries to the work queue in a consecutive and cyclic manner, and a network device including a network interface to share packet over a network, and packet processing circuitry to read the work queue entries from the work queue in a consecutive and cyclic manner, the work queue entries indicating work to be performed associated with the packets, dequeue respective ones of the work queue entries read from the work queue responsively to reading the respective work queue entries from the work queue, add the work queue entries to an execution database used to track execution of the work queue entries, and execute the work queue entries in the execution database.

43 Claims, 8 Drawing Sheets

(56) References Cited

U.S. PATENT DOCUMENTS

| | | | |
|---|---|---|---|
| 7,535,907 B2* | 5/2009 | Hussain | H04L 49/90 |
| | | | 370/469 |
| 7,813,277 B2* | 10/2010 | Okholm | H04L 69/12 |
| | | | 370/412 |
| 7,895,431 B2* | 2/2011 | Bouchard | H04L 12/56 |
| | | | 709/213 |
| 8,095,683 B2 | 1/2012 | Balasubramaniam Chandra | |
| 8,111,707 B2* | 2/2012 | Riddle | H04L 69/04 |
| | | | 711/170 |
| 8,208,380 B1 | 6/2012 | Nachum et al. | |
| 8,279,885 B2* | 10/2012 | Riddle | G06F 9/526 |
| | | | 711/170 |
| 8,913,264 B2 | 12/2014 | Skvirski | |
| 9,141,548 B2* | 9/2015 | Asher | G06F 12/0815 |
| 9,397,938 B2* | 7/2016 | Folsom | H04L 45/36 |
| 9,680,742 B2* | 6/2017 | Tompkins | H04L 47/50 |
| 9,811,467 B2* | 11/2017 | Snyder, II | G06F 12/0811 |
| 10,033,607 B2 | 7/2018 | Badea et al. | |
| 10,210,125 B2 | 2/2019 | Burstein | |
| 10,230,810 B1 | 3/2019 | Bhide et al. | |
| 10,277,518 B1 | 4/2019 | Matthews et al. | |
| 10,581,762 B2* | 3/2020 | Shpiner | H04L 47/624 |
| 10,834,006 B2 | 11/2020 | Levy et al. | |
| 10,999,366 B2 | 5/2021 | Gafni et al. | |
| 11,327,890 B1 | 5/2022 | Mukherjee | G06F 12/0897 |
| 11,374,872 B1* | 6/2022 | Danivas | H04L 47/6215 |
| 11,451,493 B2 | 9/2022 | Yefet et al. | |
| 11,513,958 B1* | 11/2022 | Mukherjee | G06F 12/0804 |
| 2001/0055274 A1 | 12/2001 | Hegge et al. | |
| 2004/0003094 A1 | 1/2004 | See | |
| 2006/0056406 A1* | 3/2006 | Bouchard | H04L 12/56 |
| | | | 370/389 |
| 2006/0265561 A1 | 11/2006 | Boyd et al. | |
| 2007/0223385 A1 | 9/2007 | Berly et al. | |
| 2008/0279102 A1 | 11/2008 | Sankaran et al. | |
| 2009/0161547 A1* | 6/2009 | Riddle | G06F 9/526 |
| | | | 370/395.7 |
| 2013/0258858 A1 | 10/2013 | Cherian et al. | |
| 2014/0078915 A1 | 3/2014 | Edsall et al. | |
| 2014/0089450 A1 | 3/2014 | Raindel et al. | |
| 2014/0223111 A1 | 8/2014 | Dinkjian et al. | |
| 2014/0280674 A1 | 9/2014 | Arramreddy et al. | |
| 2014/0286352 A1 | 9/2014 | Turgeman et al. | |
| 2014/0344536 A1 | 11/2014 | Benisty et al. | |
| 2015/0071079 A1 | 3/2015 | Kadosh et al. | |
| 2015/0134875 A1 | 5/2015 | Veal | |
| 2015/0220360 A1* | 8/2015 | Snyder, II | G06F 12/0811 |
| | | | 718/105 |
| 2015/0249604 A1* | 9/2015 | Folsom | H04L 45/36 |
| | | | 370/392 |
| 2015/0254104 A1 | 9/2015 | Kessler et al. | |
| 2015/0355883 A1 | 12/2015 | Kegel | |
| 2016/0087916 A1 | 3/2016 | Janardhanan | |
| 2017/0104642 A1 | 4/2017 | Miura et al. | |
| 2017/0279817 A1 | 9/2017 | Campbell et al. | |
| 2017/0337010 A1 | 11/2017 | Kriss et al. | |
| 2017/0339074 A1 | 11/2017 | Melman et al. | |
| 2018/0123933 A1 | 5/2018 | Yamashima et al. | |
| 2018/0183733 A1 | 6/2018 | Dcruz et al. | |
| 2019/0327190 A1 | 10/2019 | Browne et al. | |
| 2019/0334799 A1 | 10/2019 | Iizuka et al. | |
| 2020/0106740 A1 | 4/2020 | Bangalore Krishnamurthy | |
| 2020/0371708 A1 | 11/2020 | Karmani et al. | |

OTHER PUBLICATIONS

Wikipedia, "Direct Memory Access," pp. 1-7, last edited Nov. 4, 2018.

Tsirkin et al., "Virtual I/O Device (VIRTIO)", Version 1.1, OASIS Open Committee Specification 01, pp. 1-126, Apr. 11, 2019 as downloaded from https://docs.oasis-open.org/virtio/virtio/v1.1/virtio-v1.1.html.

NVM Express Inc., "NVM Express® Base Specification", Revision 2.0b, pp. 1-455, Jan. 6, 2022 as downloaded from https://nvmexpress.org/wp-content/uploads/NVM-Express-Base-Specification-2.0b-2021.12.18-Ratified.pdf.

PCI-SIG, "PCI Express® Base Specification", Revision 6.0, pp. 1-1923, Dec. 16, 2021.

CN Application # 202010419130.4 Office Action dated Feb. 29, 2024.

U.S. Appl. No. 17/714,207 Office Action dated May 21, 2024.

* cited by examiner

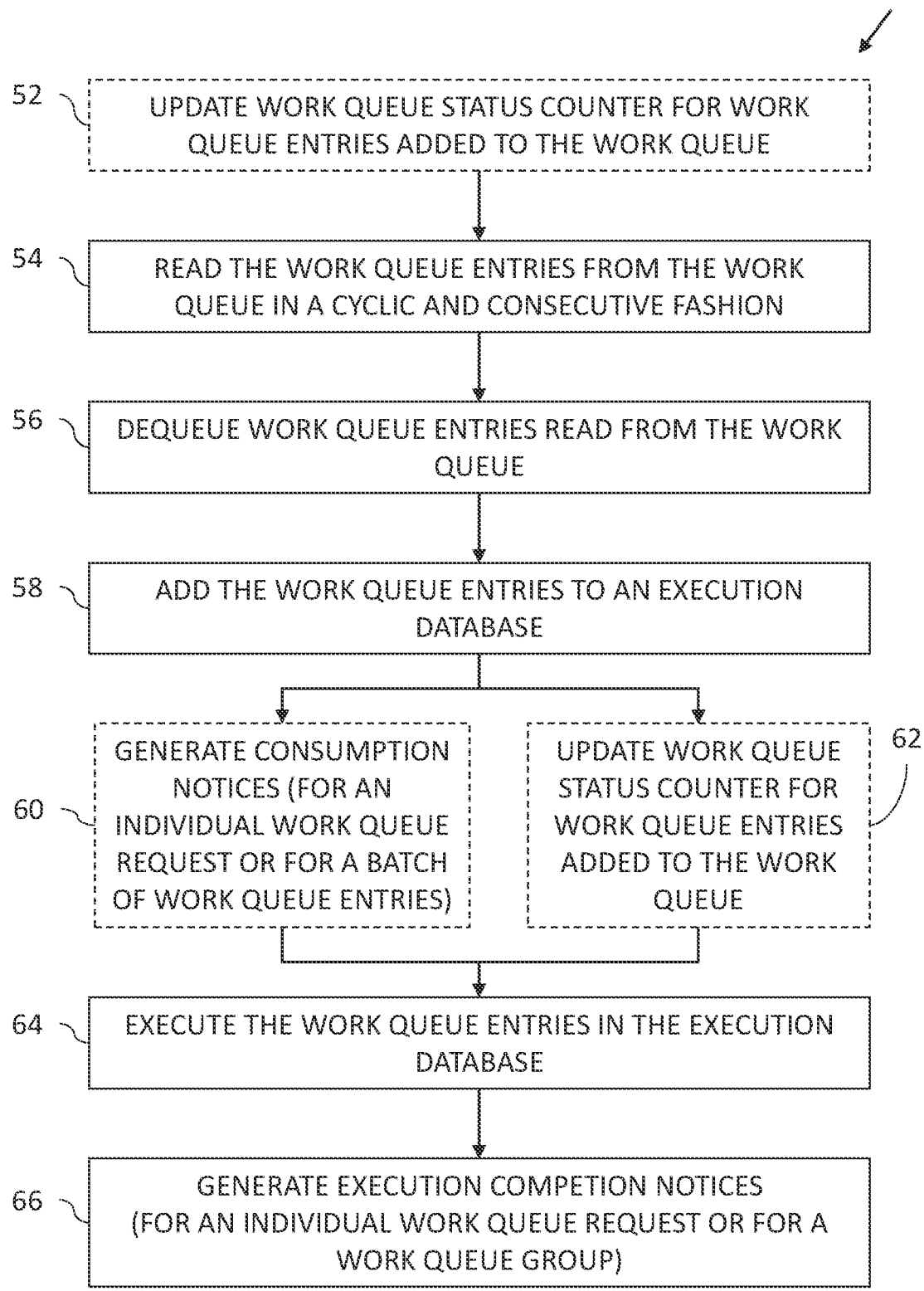

EFFICIENT NETWORK DEVICE WORK QUEUE

FIELD OF THE INVENTION

The present invention relates to computer networks, and in particular, but not exclusively to, network device work queues.

BACKGROUND

Packet processing by network devices may be managed using work queues such as receive and send work queues. The work queues may be populated by a host application with work queue entries (WQEs) specifying work to be performed. For example, a WQE may indicate that a received packet or a packet to be sent over the network should be processed.

In many systems, WQEs may be written to, and read from, a work queue in a consecutive and cyclic manner. For example, if a work queue includes ten slots (slot 0 to 9), WQEs are written to the slots in consecutive order: WQE 0 to slot 0, then to WQE 1 slot 1, etc. Once WQE 9 has been written to slot 9, the next WQE, WQE 10, is written to slot 0 once slot 0 is empty after WQE 0 has completed execution. Similarly, when slot 1 becomes free after WQE 1 has completed execution, another new WQE, WQE 11, is added to slot 1, etc. Therefore, writing to the work queue is performed in a consecutive and cyclic manner.

The work queue entries are also read in consecutive order: WQE 0 from slot 0, then WQE 1 from slot 1, etc. Similarly, once WQE 9 has been read by the network device from slot 9, the next WQE to be read by the network device is WQE 10 from slot 0. Therefore, reading from the work queue is performed in a consecutive and cyclic manner.

SUMMARY

There is provided in accordance with an embodiment of the present disclosure, a system including a memory to store a work queue including a plurality of work queue entry slots, a processing device to write work queue entries to the work queue in the work queue entry slots in a consecutive and cyclic manner so that a new work queue entry is added to a next one of the work queue entry slots, and a network device including a network interface to share packets over a network, and packet processing circuitry to read the work queue entries from the work queue in a consecutive and cyclic manner, the work queue entries indicating work to be performed associated with the packets, dequeue respective ones of the work queue entries read from the work queue responsively to reading the respective work queue entries from the work queue, add the work queue entries to an execution database used to track execution of the work queue entries, and execute the work queue entries in the execution database.

Further in accordance with an embodiment of the present disclosure the respective work queue entries are dequeued from the work queue independently of completion of the execution of the respective work queue entries.

Still further in accordance with an embodiment of the present disclosure the memory is disposed in the processing device, or the network device, or a peer device.

Additionally in accordance with an embodiment of the present disclosure, the system includes an internal hardware database, which includes the execution database.

Moreover, in accordance with an embodiment of the present disclosure the work queue entries are executed in an order different to the order of the work queue entries in the work queue.

Further in accordance with an embodiment of the present disclosure the packet processing circuitry is configured to generate execution completion notices notifying the processing device that the work queue entries have completed execution.

Still further in accordance with an embodiment of the present disclosure the work queue entries include respective identifications which identify the work queue entries independently of the identifications of the work queue slots, and the packet processing circuitry is configured to generate the execution completion notices to include the respective identifications of the work queue entries that have completed execution.

Additionally in accordance with an embodiment of the present disclosure the processing device is configured to define a work queue entry group for a group of the work queue entries, and the packet processing circuitry is configured to generate one of the execution completion notices for the work queue entry group notifying the processing device when all the work queue entries in the work queue entry group have completed execution.

Moreover, in accordance with an embodiment of the present disclosure the work queue entry group is user defined.

Further in accordance with an embodiment of the present disclosure the packet processing circuitry is configured to generate the execution completion notices to provide the processing device of an indication of at least one of the work queue entry slots that are occupied with work queue entries and/or empty.

Still further in accordance with an embodiment of the present disclosure the packet processing circuitry is configured to generate consumption notices to notify the processing device when work queue entries are dequeued from the work queue.

Additionally in accordance with an embodiment of the present disclosure the packet processing circuitry is configured to generate a consumption notice to notify the processing device when a batch of work queue entries are dequeued from the work queue.

Moreover, in accordance with an embodiment of the present disclosure, the system includes a work queue status counter, wherein the packet processing circuitry is configured to update the work queue status counter to indicate the work queue entries that have been dequeued from the work queue.

Further in accordance with an embodiment of the present disclosure the packet processing circuitry is configured to generate consumption notices to notify the processing device when work queue entries are dequeued from the work queue.

Still further in accordance with an embodiment of the present disclosure the packet processing circuitry is configured to generate a consumption notice to notify the processing device when a batch of work queue entries are dequeued from the work queue.

Additionally in accordance with an embodiment of the present disclosure, the system includes a work queue status counter, wherein the packet processing circuitry is configured to update the work queue status counter to indicate the work queue entries that have been dequeued from the work queue.

There is also provided in accordance with another embodiment of the present disclosure, a work queue management method, including storing a work queue including a plurality of work queue entry slots, writing work queue entries to the work queue entry slots in a consecutive and cyclic manner so that a new work queue entry is added to a next one of the work queue entry slots, reading by a network device the work queue entries from the work queue in a consecutive and cyclic manner, the work queue entries indicating work to be performed associated with packets, dequeuing by a network device respective ones of the work queue entries read from the work queue responsively to reading the respective work queue entries from the work queue, adding by a network device the work queue entries to an execution database used to track execution of the work queue entries, and executing by a network device the work queue entries in the execution database.

Moreover, in accordance with an embodiment of the present disclosure the respective work queue entries are dequeued from the work queue independently of completion of the execution of the respective work queue entries.

Further in accordance with an embodiment of the present disclosure the work queue entries are executed in an order different to the order of the work queue entries in the work queue.

Still further in accordance with an embodiment of the present disclosure, the method includes generating execution completion notices notifying that the work queue entries have completed execution.

Additionally in accordance with an embodiment of the present disclosure the work queue entries include respective identifications which identify the work queue entries independently of the identifications of the work queue slots, and the generating includes generating the execution completion notices to include the respective identifications of the work queue entries that have completed execution.

Moreover, in accordance with an embodiment of the present disclosure, the method includes defining a work queue entry group for a group of the work queue entries, and wherein the generating includes generating one of the execution completion notices for the work queue entry group notifying when all the work queue entries in the work queue entry group have completed execution.

Further in accordance with an embodiment of the present disclosure the work queue entry group is user defined.

Still further in accordance with an embodiment of the present disclosure the generating includes generating the execution completion notices to provide an indication of at least one of the work queue entry slots that are occupied with work queue entries and/or empty.

Additionally in accordance with an embodiment of the present disclosure, the method includes generating consumption notices to notify when work queue entries are dequeued from the work queue.

Moreover, in accordance with an embodiment of the present disclosure, the method includes generating a consumption notice to notify when a batch of work queue entries are dequeued from the work queue.

Further in accordance with an embodiment of the present disclosure, the method includes updating a work queue status counter to indicate the work queue entries that have been dequeued from the work queue.

There is also provided in accordance with still another embodiment of the present disclosure, a network device including a network interface to share packets over a network, and packet processing circuitry to read work queue entries from a work queue in a consecutive and cyclic manner, the work queue entries indicating work to be performed associated with the packets, dequeue respective ones of the work queue entries read from the work queue responsively to reading the respective work queue entries from the work queue, add the work queue entries to an execution database used to track execution of the work queue entries, and execute the work queue entries in the execution database.

Further in accordance with an embodiment of the present disclosure the respective work queue entries are dequeued from the work queue independently of completion of the execution of the respective work queue entries.

Still further in accordance with an embodiment of the present disclosure, the device includes a memory to store the work queue.

Additionally in accordance with an embodiment of the present disclosure, the device includes an internal hardware database, which includes the execution database.

Moreover, in accordance with an embodiment of the present disclosure the work queue entries are executed in an order different to the order of the work queue entries in the work queue.

Further in accordance with an embodiment of the present disclosure the packet processing circuitry is configured to generate execution completion notices notifying a processing device that the work queue entries have completed execution.

Still further in accordance with an embodiment of the present disclosure the work queue entries include respective identifications which identify the work queue entries independently of the identifications of the work queue slots, and the packet processing circuitry is configured to generate the execution completion notices to include the respective identifications of the work queue entries that have completed execution.

Additionally in accordance with an embodiment of the present disclosure a work queue entry group defines a group of the work queue entries, and the packet processing circuitry is configured to generate one of the execution completion notices for the work queue entry group notifying the processing device when all the work queue entries in the work queue entry group have completed execution.

Moreover, in accordance with an embodiment of the present disclosure the work queue entry group is user defined.

Further in accordance with an embodiment of the present disclosure the packet processing circuitry is configured to generate the execution completion notices to provide the processing device of an indication of at least one of the work queue entry slots that are occupied with work queue entries and/or empty.

Still further in accordance with an embodiment of the present disclosure the packet processing circuitry is configured to generate consumption notices to notify the processing device when work queue entries are dequeued from the work queue.

Additionally in accordance with an embodiment of the present disclosure the packet processing circuitry is configured to generate a consumption notice to notify the processing device when a batch of work queue entries are dequeued from the work queue.

Moreover, in accordance with an embodiment of the present disclosure the packet processing circuitry is configured to update a work queue status counter to indicate the work queue entries that have been dequeued from the work queue.

Further in accordance with an embodiment of the present disclosure the packet processing circuitry is configured to generate consumption notices to notify a processing device when work queue entries are dequeued from the work queue.

Still further in accordance with an embodiment of the present disclosure the packet processing circuitry is configured to generate a consumption notice to notify a processing device when a batch of work queue entries are dequeued from the work queue.

Additionally in accordance with an embodiment of the present disclosure the packet processing circuitry is configured to update a work queue status counter to indicate the work queue entries that have been dequeued from the work queue.

BRIEF DESCRIPTION OF THE DRAWINGS

The present invention will be understood from the following detailed description, taken in conjunction with the drawings in which:

FIG. 8 is a flowchart including steps in a method of operation of the system of FIGS. 1-7.

DESCRIPTION OF EXAMPLE EMBODIMENTS

Overview

Figure 1:
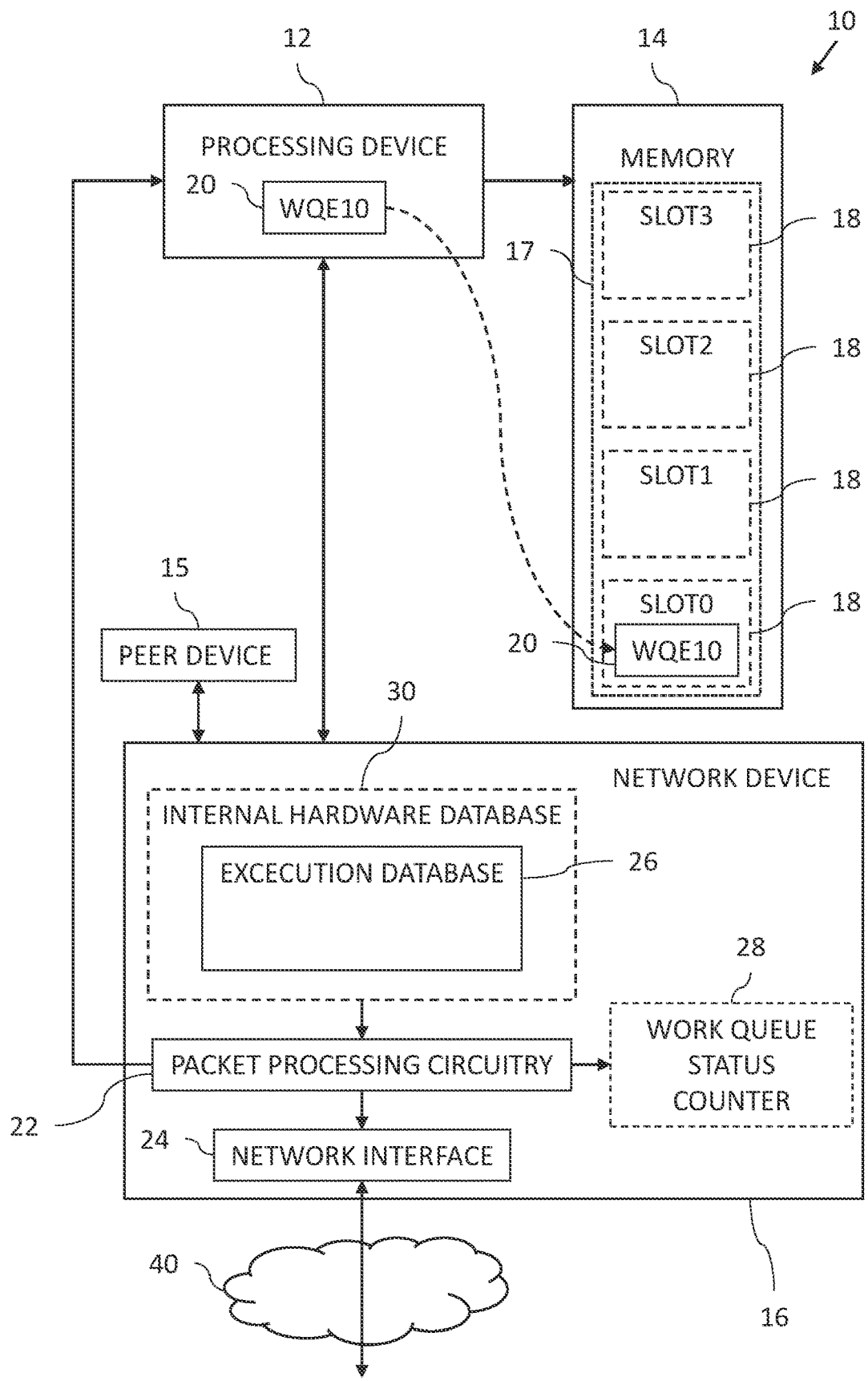
FIGS. 1-7 are block diagram views of a computer system constructed and operative in accordance with an embodiment of the present invention.

As previously mentioned, in many systems, WQEs may be served from a work queue in a consecutive and cyclic manner.

For example, if a work queue includes ten slots (slot 0 to 9), WQEs are written to the slots in consecutive order: WQE 0 to slot 0, then WQE 1 to slot 1, etc. Once WQE 9 has been written to slot 9, the next WQE, WQE 10, is written to slot 0 once slot 0 is empty after WQE 0 has completed execution. Similarly, when slot 1 becomes free after WQE 1 has completed execution, another new WQE, WQE 11, is added to slot 1, etc. Therefore, writing to the work queue is performed in a consecutive and cyclic manner. The work queue entries are also read in consecutive order. WQE 0 from slot 0, then WQE 1 from slot 1, etc. Similarly, once WQE 9 has been read by the network device from slot 9, the next WQE to be read by the network device is WQE 10 from slot 0. Therefore, reading the work queue is performed in a consecutive and cyclic manner.

Some jobs associated with WQEs take more time to complete than others for various technical reasons. For example, if the next slot to be read from is slot 0 and the current WQE in slot 0 is taking a long time to complete but slots 1-3 are empty (as the WQEs associated with slots 1-3 have already completed execution), no new WQEs will be added to work queue for processing until the WQE in slot 0 has completed execution. This may lead to delays and wasted processing capacity.

WQEs are generally served in a consecutive and cyclic manner as it simplifies software processing with regard to the next slot to which to post a WQE. Skipping slots may be accomplished using linked lists by keeping track of skipped slots so that when a slot becomes free that slot is used. A linked list uses a link in each WQE which points to the next available WQE and when a WQE is posted to the work queue, the system indicates to hardware where the next WQE will be posted. However, handling a linked list is costly in terms of central processing unit (CPU) utilization or hardware complexity (if an Application Specific Integrated Circuit (ASIC) is used). It is generally much quicker to post entries to, and serve entries from, a work queue in a cyclic manner (as described above) as larger blocks can be scanned at once. It is also more efficient as reading a large block of consecutive WQEs saves bus overhead incurred in per local bus read. Furthermore, it allows implementing efficient prefetching since with a link list, in the manner described above, WQEs are read serially, as it is generally impossible to determine the next WQE location before reading the current WQE.

Therefore, embodiments of the present invention solve at least some of the above technical issues, by providing a system in which WQEs are posted to, and read from, a work queue in a consecutive and cyclic manner (e.g., using batch fetching) while avoiding delays and wasted processing capacity associated with WQEs taking different time periods to be executed.

In some embodiments, a system in which a processing device (e.g., an application running on a host device) writes WQEs to a work queue in a memory (e.g., host memory) in a consecutive and cyclic manner, and a network device reads the WQEs from the work queue in a consecutive and cyclic manner. However, after reading the WQEs from the work queue, the network device dequeues the WQEs from the work queue and adds the read WQEs to an execution database (e.g., a linked list or hash table in hardware such as an internal hardware database). Therefore, the WQEs are dequeued from the work queue independently of completion of execution of the WQEs. The execution database is used by the network device to track execution of the WQEs in the execution database. Although the WQEs are read and dequeued from the work queue in order (in a consecutive and cyclic manner) the WQEs in the execution database may be executed in any order with some WQEs taking more time than others to execute depending on a number of factors. The term "dequeue" used in the specification and claims, in all grammatical forms, is defined as removing a WQE from a work queue.

For example, if a work queue includes ten slots (slot 0 to 9), WQEs are written to the slots in consecutive order: WQE 0 to slot 0, then to WQE 1 slot 1, etc. Once WQE 9 has been written to slot 9, the next WQE, WQE 10, is written to slot 0 once slot 0 is empty after WQE 0 has been dequeued from the work queue. Similarly, when slot 1 becomes free after WQE 1 has been dequeued from the work queue, another new WQE, WQE 11, is added to slot 1, etc. Therefore, writing to the work queue is performed in a consecutive and cyclic manner.

The work queue entries are also read in consecutive order: WQE 0 from slot 0, then WQE 1 from slot 1, etc. Similarly, once WQE 9 has been read by the network device from slot 9, the next WQE to be read by the network device is WQE 10 from slot 0. Therefore, reading from the work queue is performed in a consecutive and cyclic manner.

As WQEs are dequeued from the work queue independently of completion of execution of the WQEs, the processing device is generally informed when WQEs are dequeued (e.g., using consumption notices or a status counter) and when WQEs complete execution.

In some embodiments, the network device generates consumption notices to notify the processing device when WQEs are dequeued from the work queue. In some embodiments, the network device writes the execution consumption notices to a consumption notice queue in a memory. The queue is intermittently read by the processing device. In some embodiments, the network device sends the consumption notices to the processing device. In some embodiments, the network device generates a consumption notice when a batch of work entries (e.g., for a predefined batch of WQEs, for a given number of WQEs, or after a given time delay since the last consumption notice was generated) are dequeued from the work queue. In some embodiments, the number of WQEs currently in the work queue may be tracked using a status counter which is updated when WQEs are posted to the work queue and when WQEs are dequeued from the work queue. The status counter may be used in addition to, or instead of, the consumption notice.

In some embodiments, the network device generates execution completion notices notifying the processing device when the WQEs have completed execution. In some embodiments, the network device writes the execution completion notices to a completion notice queue in a memory. The queue is intermittently read by the processing device. In some embodiments, the network device sends the completion notices to the processing device. As the work queue slot associated with a WQE may not uniquely identify a WQE that has completed execution (because WQEs may be not complete execution in order), the completion notices may identify the respective WQEs completing execution using identifications of the WQEs (independently of, or in addition to, the work queue slot identifications). In some embodiments, when the network device generates an execution completion notice, the execution completion notice is also generated to provide the processing device with an indication of work entry slot(s) that are occupied and/or empty. For example, the indication of the WQE slots 20 may include one or more of the following: an index of the highest available slot, the number of available slots, the number of occupied slots, and/or indices of free slots.

In some embodiments, the processing device defines a work queue entry group for a given group of WQEs. The network device may then generate an execution completion notice when all the WQEs in the work queue entry group have completion execution.

System Description

Reference is now made to FIG. 1, which is block diagram view of a computer system 10 constructed and operative in accordance with an embodiment of the present invention. The computer system 10 comprises a processing device 12 (e.g., a host computer, server, or any suitable processing device), a memory 14, and a network device 16 (e.g., a network interface controller, a data processing unit (DPU), a switch, or any suitable network device). The processing device 12 and the network device 16 may be connected via any suitable interface, for example, a peripheral data bus connection.

The memory 14 is configured to store a work queue 17, which includes a plurality of work queue entry slots 18. In some embodiments, the memory 14 is disposed in the processing device 12, or the network device 16, or a peer device 15.

The processing device 12, for example, via a software application, is configured to generate work queue entries (WQEs) and write the WQEs to the work queue 17 in the work queue entry slots 18 in a consecutive and cyclic manner so that a new work queue entry is added to a next (empty) one of the work queue entry slots 18. In some cases, the processing device 12 is configured to write the WQEs to the work queue 17 in the work queue entry slots 18 in the consecutive and cyclic manner so that a new work queue entry is added to a next empty one of the work queue entry slots 18, responsively to an existing work queue entry being dequeued from the next work queue entry slot 18. The consecutive and cyclic manner of writing and reading WQEs is described in more detail with reference to FIGS. 1-8. FIG. 1 shows the processing device 12 generating WQE 10 (labeled with reference numeral 20) to slot 0 in the work queue 17.

The network device 16 includes packet processing circuitry 22, and a network interface 24. The network interface 24 is configured to share packets or other data over a network 40. The packet processing circuitry 22 is configured to process packets received over the network 40 and process packets for sending over the network 40. The packet processing circuitry 22 may include any suitable packet processing circuitry, such as physical layer (PHY) circuitry, MAC circuitry, message handling circuitry, circuitry to implement a full network stack including network and transaction layers for example to receive acknowledgments. Execution completion described herein may be responsive to a network acknowledgment being received. The computer system 10 may also include a work queue status counter 28 which is updated by the packet processing circuitry 22. The work queue status counter 28 may be stored in the memory 14 or any suitable memory in the network device 16, the processing device 12, or the peer device 15. In some embodiments, the computer system 10 comprises an internal hardware database 30, which includes an execution database 26. The execution database 26 may use a linked list or hash table during operation, by way of example. The internal hardware database 30 may be stored in memory 14 or any suitable memory in the network device 16, the processing device 12, or the peer device 15.

In practice, some or all of the functions of the processing device 12 and packet processing circuitry 22 may be combined in a single physical component or, alternatively, implemented using multiple physical components. These physical components may comprise hard-wired or programmable devices, or a combination of the two. In some embodiments, at least some of the functions of the processing device 12 and the packet processing circuitry 22 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 2:
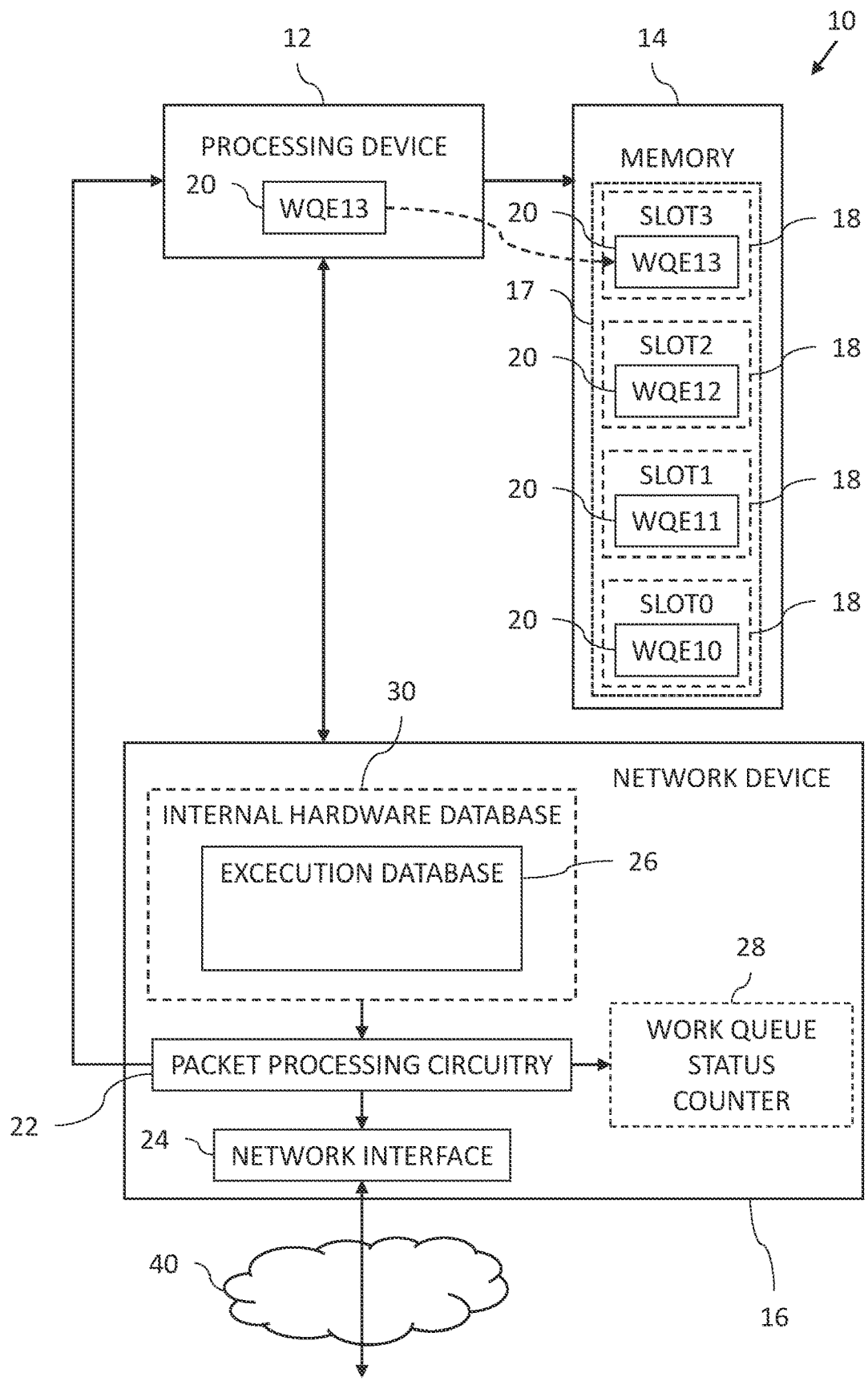

Reference is now made to FIG. 2, which is a block diagram view of the computer system 10 of FIG. 1 illustrating another aspect of the system. FIG. 2 shows that WQE 11 has been written to slot 1, followed by WQE 12 being written to slot 2. FIG. 2 shows the processing device 12 generating WQE 13 and writing WQE 13 to slot 3. All four slots of the work queue 17 are now occupied with WQEs.

Figure 3:
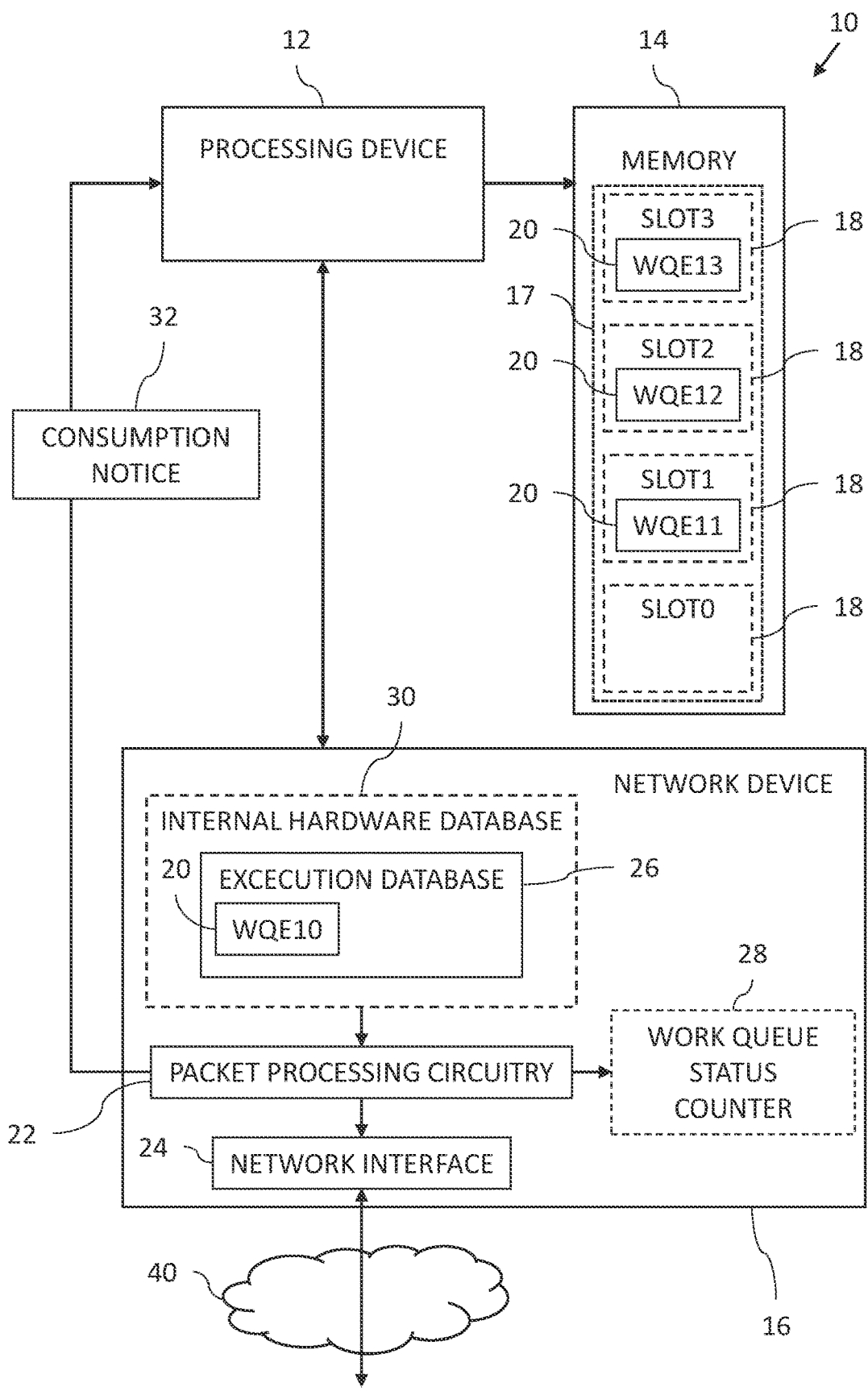

Reference is now made to FIG. 3, which is a block diagram view of the computer system 10 of FIG. 1 illustrating another aspect of the system. FIG. 3 shows that WQE 10 has been read by network device 16 from slot 0 of the work queue 17 into the execution database 26. The network device 16 also dequeues WQE 10 from the work queue 17 leaving slot 0 of the work queue 17 free for a new WQE. The network device 16 generates a consumption notice 32 to notify the processing device 12 that there is a free slot in the work queue 17.

Figure 4:
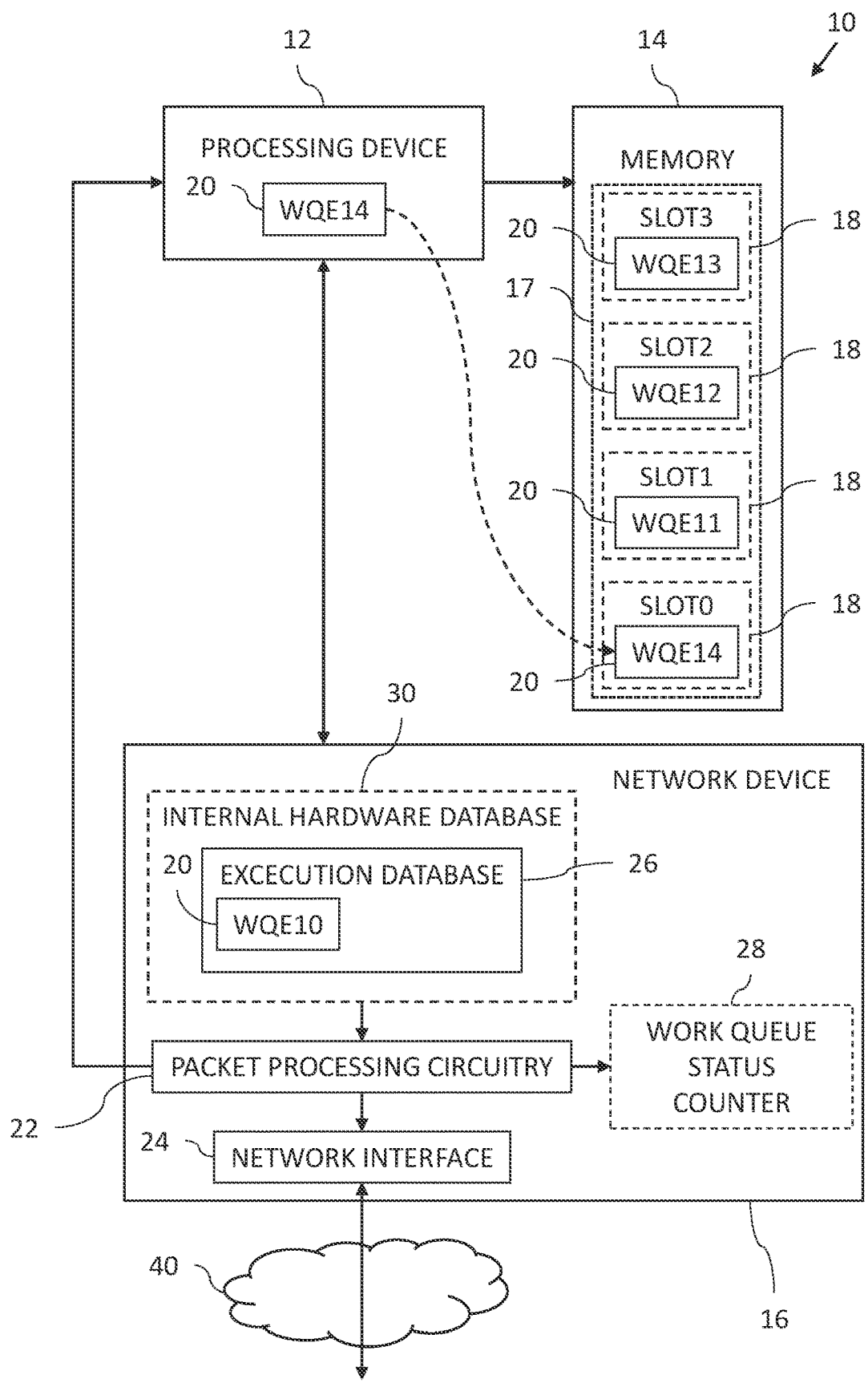

Reference is now made to FIG. 4, which is a block diagram view of the computer system 10 of FIG. 1 illustrating another aspect of the system. FIG. 4 shows processing device 12 generating WQE 14 and writing WQE 14 to free slot 0 in the work queue 17. Therefore, it can be seen that processing device 12 is configured to write WQEs to the work queue 17 in the work queue entry slots 18 in a consecutive (e.g., slot 0, then slot 1 etc.) and cyclic manner (e.g., after writing to slot 3, the next slot to be written to is slot 0) so that a new WQE is added to a next empty work queue entry slot 18.

Figure 5:
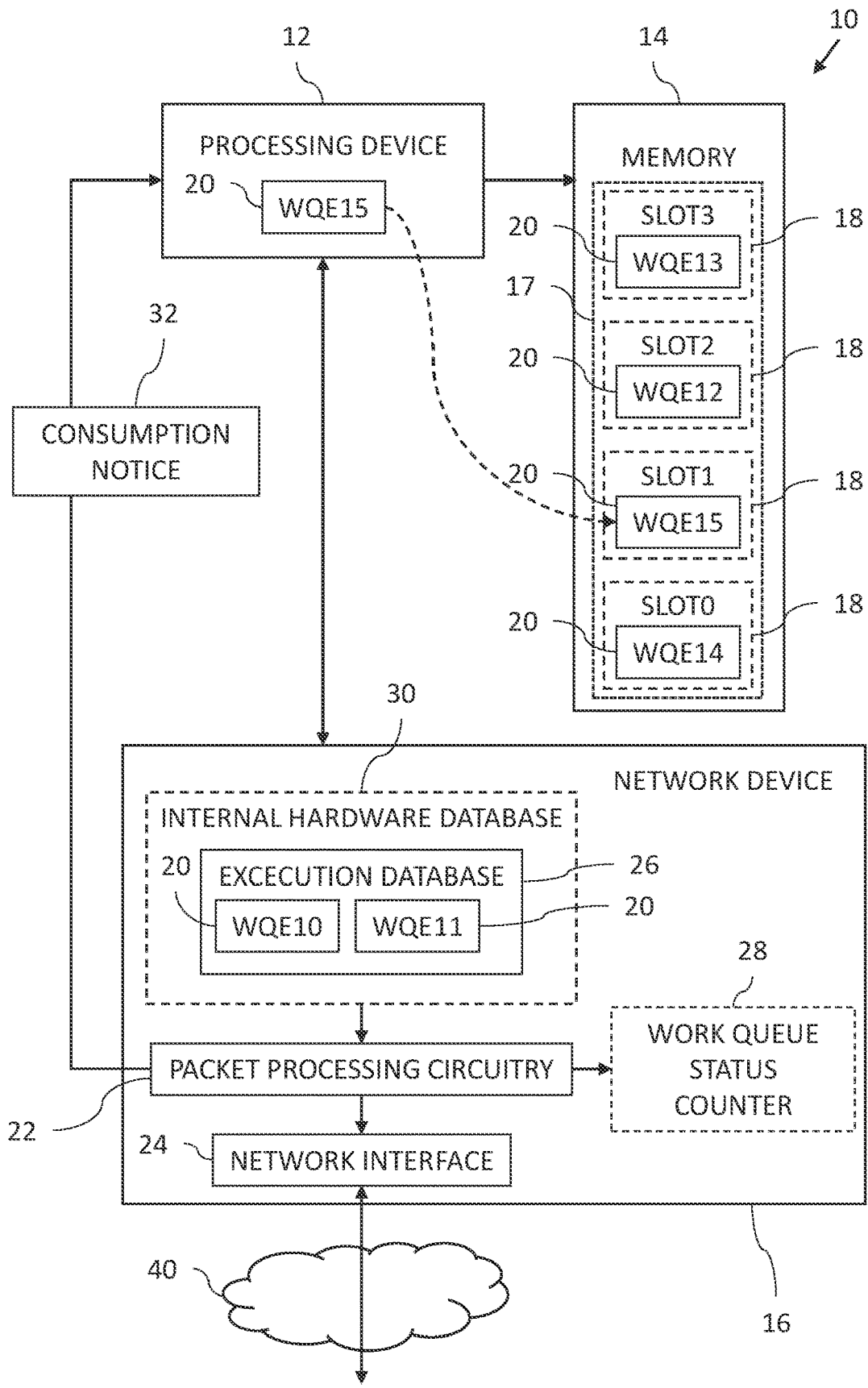

Reference is now made to FIG. 5, which is a block diagram view of the computer system 10 of FIG. 1 illustrating another aspect of the system. FIG. 5 shows that WQE 11 has been read and dequeued from slot 1 and added to the execution database 26. At this point in time, the execution database 26 includes WQE 10 and WQE 11. The network device 16 generates a consumption notice 32 notifying the processing device 12 that there is one free slot in the work queue 17. In response, the processing device 12 generates WQE 15 and writes WQE 15 to slot 1 in the work queue 17.

Figure 6:
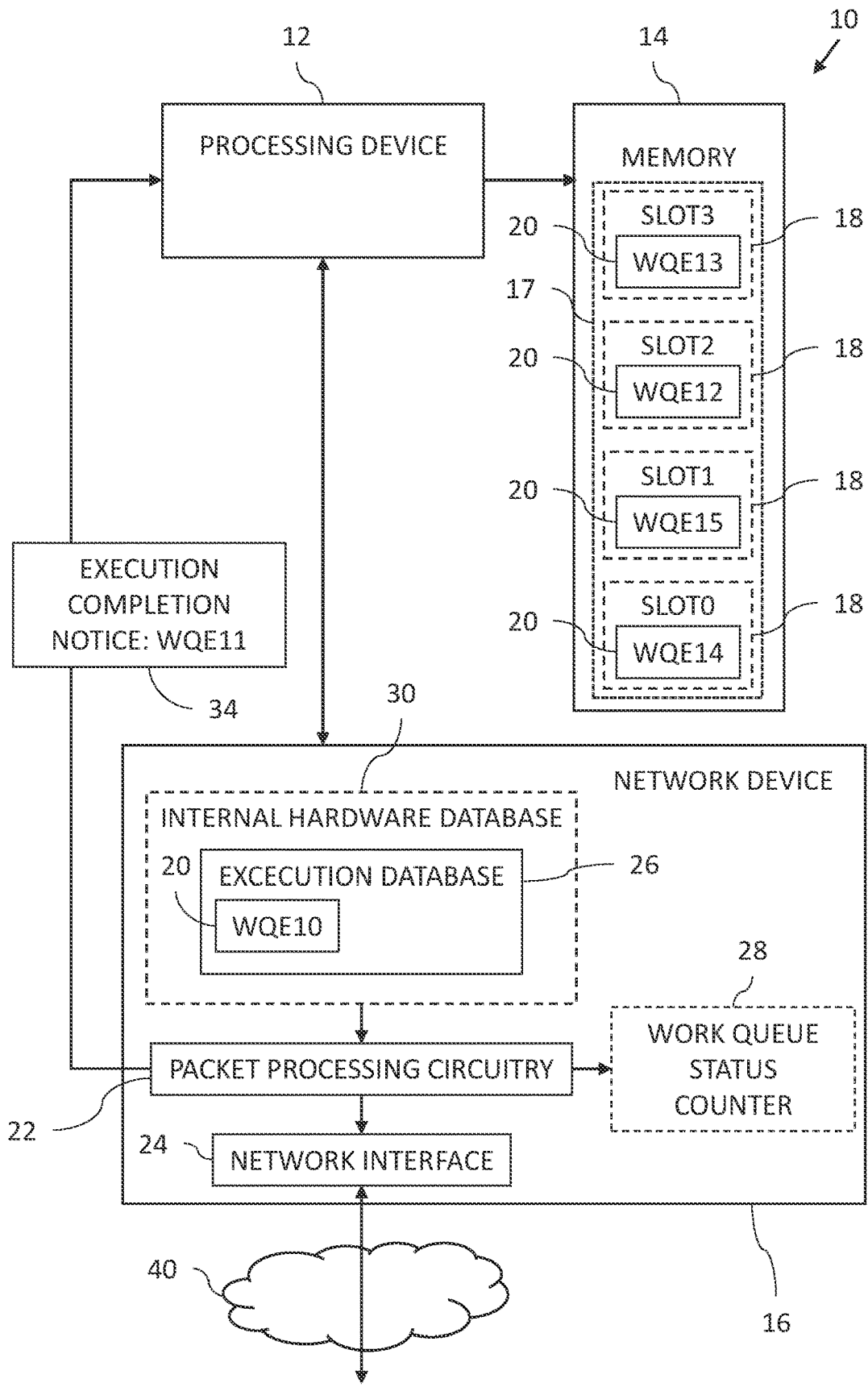

Reference is now made to FIG. 6, which is a block diagram view of the computer system 10 of FIG. 1 illustrating another aspect of the system. FIG. 11 shows that WQE 11 has completed execution and the network device 16 generates an execution completion notice 34 for the processing device 12 indicating that WQE 11 has completed execution. If the execution completion notice 34 references the slot identification in the work queue 17 (without referencing a unique identification of WQE 11) then it would be ambiguous as to whether WQE 11 or WQE 15 has completed execution.

Figure 7:
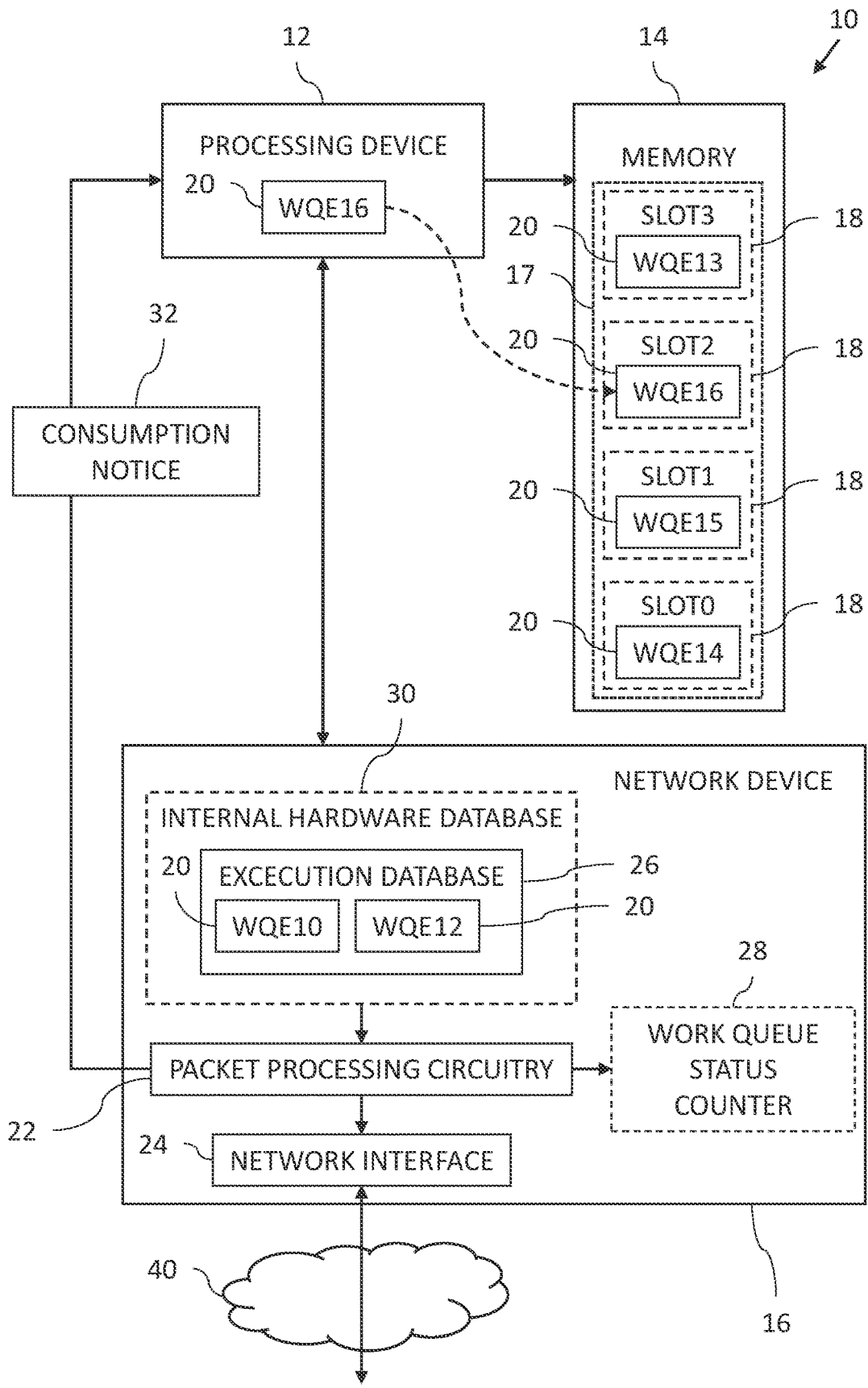

Reference is now made to FIG. 7, which is a block diagram view of the computer system 10 of FIG. 1 illustrating another aspect of the system. FIG. 7 shows that WQE 12 has been read and dequeued from slot 2 and added to the execution database 26. FIG. 7 also shows that processing device 12 is generating WQE 16, and writing WQE 16 to slot 2 in work queue 17.

Reference is now made to FIG. 8, which is a flowchart 50 including steps in a method of operation of the system 10 of FIGS. 1-7. In some embodiments, the packet processing circuitry 22 is configured to update the work queue status counter 28 for WQEs added to the work queue 17 (block 52).

The packet processing circuitry 22 is configured to read the WQEs from the work queue in a consecutive and cyclic manner (block 54) (e.g., first from slot 0, then from slot 1 until slot 3 is reached, then reading continues from slot 0, in a consecutive and cyclic manner). The WQEs indicate work to be performed associated with the packets. It should be noted that the network device 16 may be configured to read and dequeue WQEs from work queue 17 into the execution database 26 when there is spare capacity to execute more WQEs.

The packet processing circuitry 22 is configured to dequeue respective WQEs read from the work queue 17 responsively to reading the respective WQEs from the work queue 17 (block 56). In other word, each time a WQE is read from the work queue 17, that WQE is dequeued from the work queue 17. The respective WQEs are dequeued from the work queue 17 independently of completion of the execution of the respective WQEs. The dequeuing of a WQE is triggered by the reading of that WQE and is performed sometime between being reading that WQE but prior to completion of execution of that WQE. The packet processing circuitry 22 is configured to add the WQEs read from the work queue 17 to the execution database 26 used to track execution of the WQEs (block 58).

In some embodiments, the packet processing circuitry 22 is configured to generate consumption notices 32 to notify the processing device 12 when WQEs are dequeued from the work queue 17 (block 60). In some embodiments, the packet processing circuitry 22 is configured to generate one consumption notice 32 for each WQE that is dequeued from the work queue 17. In some embodiments, the packet processing circuitry 22 is configured to generate one consumption notice 32 to notify the processing device 12 when a batch of WQEs are dequeued from the work queue 17. The size of the batch may be based on a given number of dequeued WQEs or after a certain time period, or if there are no more WQEs to be read from the work queue 17.

In some embodiments, the packet processing circuitry 22 is configured to update the work queue status counter 28 to indicate the WQEs that have been dequeued from the work queue 17 (block 62). For example, each time a WQE is dequeued from work queue 17, the packet processing circuitry 22 may be configured to decrement (or increment) the work queue status counter 28 by a given value (e.g., 1).

The packet processing circuitry 22 is configured to execute the WQEs in the execution database 26 (block 64). The WQEs may be executed in any suitable order different to the order of the WQEs in the work queue 17.

The packet processing circuitry 22 is configured to generate execution completion notices 34 notifying the processing device 12 that the WQEs have completed execution (block 66). In some embodiments, the packet processing circuitry 22 is configured to generate one execution completion notice 34 for each WQE that has completed execution. In some embodiments, the work queue entries include respective identifications which identify the WQEs independently of the identifications of the work queue slots, and the packet processing circuitry 22 is configured to generate the execution completion notices 34 to include the respective identifications of the WQEs that have completed execution.

In some embodiments, the processing device 12 is configured to define a work queue entry (WQE) group for a group of the WQEs. The WQEs in the work queue entry group may be user defined. A user may add indications in the WQEs from which the network device 16 deduces WQE group association. For example, each WQE may have a group number indication, and the last WQE in the WQE group can have a "last" indication. Other mechanisms are also possible, such as, in addition to group index, all WQEs in a WQE group may have "X" and "Y" indication whereby X is the current sequence number in group and Y is the total number of requests in the group so that when X=Y for a WQE, the values of X and Y indicate the last member of the group. The packet processing circuitry 22 is configured to generate one execution completion notice 34 for the work queue entry group notifying the processing device 12 when all the WQEs in the work queue entry group have completed execution. In some embodiments, the packet processing circuitry 22 is configured to generate the execution completion notices 34 to also provide the processing device 12 with an indication of the work queue entry slot(s) 20 that are occupied with WQEs and/or empty. In other words, the execution completion notice 34 may include a notification that all the WQEs in the work queue entry group have completed execution and an indication of the work queue entry slots 20 that are occupied with WQEs or empty. For example, the indication of the WQE slots 20 may include one or more of the following: an index of the highest available slot, the number of available slots, the number of occupied slots, and/or indices of free slots.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A system comprising:
    a memory to store a work queue including a plurality of work queue entry slots;
    a processing device to write work queue entries to the work queue in the work queue entry slots in a consecutive and cyclic manner so that a new work queue entry is added to a next one of the work queue entry slots; and
    a network device including: a network interface to share packets over a network; and packet processing circuitry to:
        read the work queue entries from the work queue in a consecutive and cyclic manner, the work queue entries indicating work to be performed associated with the packets;
        dequeue respective ones of the work queue entries read from the work queue responsively to reading the respective work queue entries from the work queue;
        add the work queue entries to an execution database used to track execution of the work queue entries; and
        execute the work queue entries in the execution database.
2. The system according to claim 1, wherein the respective work queue entries are dequeued from the work queue independently of completion of the execution of the respective work queue entries.
3. The system according to claim 1, wherein the memory is disposed in the processing device, or the network device, or a peer device.
4. The system according to claim 1, further comprising an internal hardware database, which includes the execution database.
5. The system according to claim 1, wherein the work queue entries are executed in an order different to the order of the work queue entries in the work queue.
6. The system according to claim 1, wherein the packet processing circuitry is configured to generate execution completion notices notifying the processing device that the work queue entries have completed execution.
7. The system according to claim 6, wherein:
    the work queue entries include respective identifications which identify the work queue entries independently of the identifications of the work queue slots; and
    the packet processing circuitry is configured to generate the execution completion notices to include the respective identifications of the work queue entries that have completed execution.
8. The system according to claim 6, wherein:
    the processing device is configured to define a work queue entry group for a group of the work queue entries; and
    the packet processing circuitry is configured to generate one of the execution completion notices for the work queue entry group notifying the processing device when all the work queue entries in the work queue entry group have completed execution.
9. The system according to claim 8, wherein the work queue entry group is user defined.
10. The system according to claim 6, wherein the packet processing circuitry is configured to generate the execution completion notices to provide the processing device of an indication of at least one of the work queue entry slots that are occupied with work queue entries and/or empty.
11. The system according to claim 6, wherein the packet processing circuitry is configured to generate consumption notices to notify the processing device when work queue entries are dequeued from the work queue.
12. The system according to claim 6, wherein the packet processing circuitry is configured to generate a consumption notice to notify the processing device when a batch of work queue entries are dequeued from the work queue.
13. The system according to claim 6, further comprising a work queue status counter, wherein the packet processing circuitry is configured to update the work queue status counter to indicate the work queue entries that have been dequeued from the work queue.
14. The system according to claim 1, wherein the packet processing circuitry is configured to generate consumption notices to notify the processing device when work queue entries are dequeued from the work queue.
15. The system according to claim 1, wherein the packet processing circuitry is configured to generate a consumption notice to notify the processing device when a batch of work queue entries are dequeued from the work queue.
16. The system according to claim 1, further comprising a work queue status counter, wherein the packet processing circuitry is configured to update the work queue status counter to indicate the work queue entries that have been dequeued from the work queue.
17. A work queue management method, comprising:
    storing a work queue including a plurality of work queue entry slots;
    writing work queue entries to the work queue in the work queue entry slots in a consecutive and cyclic manner so that a new work queue entry is added to a next one of the work queue entry slots;
    reading by a network device the work queue entries from the work queue in a consecutive and cyclic manner, the work queue entries indicating work to be performed associated with packets;
    dequeuing by a network device respective ones of the work queue entries read from the work queue responsively to reading the respective work queue entries from the work queue;
    adding by a network device the work queue entries to an execution database used to track execution of the work queue entries; and
    executing by a network device the work queue entries in the execution database.
18. The method according to claim 17, wherein the respective work queue entries are dequeued from the work queue independently of completion of the execution of the respective work queue entries.
19. The method according to claim 17, wherein the work queue entries are executed in an order different to the order of the work queue entries in the work queue.
20. The method according to claim 17, further comprising generating execution completion notices notifying that the work queue entries have completed execution.

21. The method according to claim 20, wherein:
the work queue entries include respective identifications which identify the work queue entries independently of the identifications of the work queue slots; and
the generating includes generating the execution completion notices to include the respective identifications of the work queue entries that have completed execution.

22. The method according to claim 20, further comprising defining a work queue entry group for a group of the work queue entries, and wherein the generating includes generating one of the execution completion notices for the work queue entry group notifying when all the work queue entries in the work queue entry group have completed execution.

23. The method according to claim 22, wherein the work queue entry group is user defined.

24. The method according to claim 20, wherein the generating includes generating the execution completion notices to provide an indication of at least one of the work queue entry slots that are occupied with work queue entries and/or empty.

25. The method according to claim 17, further comprising generating consumption notices to notify when work queue entries are dequeued from the work queue.

26. The method according to claim 17, further comprising generating a consumption notice to notify when a batch of work queue entries are dequeued from the work queue.

27. The method according to claim 17, further comprising updating a work queue status counter to indicate the work queue entries that have been dequeued from the work queue.

28. A network device comprising:
a network interface to share packets over a network; and
packet processing circuitry to:
read work queue entries from a work queue in a consecutive and cyclic manner, the work queue entries indicating work to be performed associated with the packets;
dequeue respective ones of the work queue entries read from the work queue responsively to reading the respective work queue entries from the work queue;
add the work queue entries to an execution database used to track execution of the work queue entries; and
execute the work queue entries in the execution database.

29. The device according to claim 28, wherein the respective work queue entries are dequeued from the work queue independently of completion of the execution of the respective work queue entries.

30. The device according to claim 28, further comprising a memory to store the work queue.

31. The device according to claim 28, further comprising an internal hardware database, which includes the execution database.

32. The device according to claim 28, wherein the work queue entries are executed in an order different to the order of the work queue entries in the work queue.

33. The device according to claim 28, wherein the packet processing circuitry is configured to generate execution completion notices notifying a processing device that the work queue entries have completed execution.

34. The device according to claim 33, wherein:
the work queue entries include respective identifications which identify the work queue entries independently of the identifications of the work queue slots; and
the packet processing circuitry is configured to generate the execution completion notices to include the respective identifications of the work queue entries that have completed execution.

35. The device according to claim 33, wherein:
a work queue entry group defines a group of the work queue entries; and
the packet processing circuitry is configured to generate one of the execution completion notices for the work queue entry group notifying the processing device when all the work queue entries in the work queue entry group have completed execution.

36. The device according to claim 35, wherein the work queue entry group is user defined.

37. The device according to claim 33, wherein the packet processing circuitry is configured to generate the execution completion notices to provide the processing device of an indication of at least one of the work queue entry slots that are occupied with work queue entries and/or empty.

38. The device according to claim 33, wherein the packet processing circuitry is configured to generate consumption notices to notify the processing device when work queue entries are dequeued from the work queue.

39. The device according to claim 33, wherein the packet processing circuitry is configured to generate a consumption notice to notify the processing device when a batch of work queue entries are dequeued from the work queue.

40. The device according to claim 33, wherein the packet processing circuitry is configured to update a work queue status counter to indicate the work queue entries that have been dequeued from the work queue.

41. The device according to claim 28, wherein the packet processing circuitry is configured to generate consumption notices to notify a processing device when work queue entries are dequeued from the work queue.

42. The device according to claim 28, wherein the packet processing circuitry is configured to generate a consumption notice to notify a processing device when a batch of work queue entries are dequeued from the work queue.

43. The device according to claim 28, wherein the packet processing circuitry is configured to update a work queue status counter to indicate the work queue entries that have been dequeued from the work queue.

* * * * *